United States Patent Office 2,908,661
Patented Oct. 13, 1959

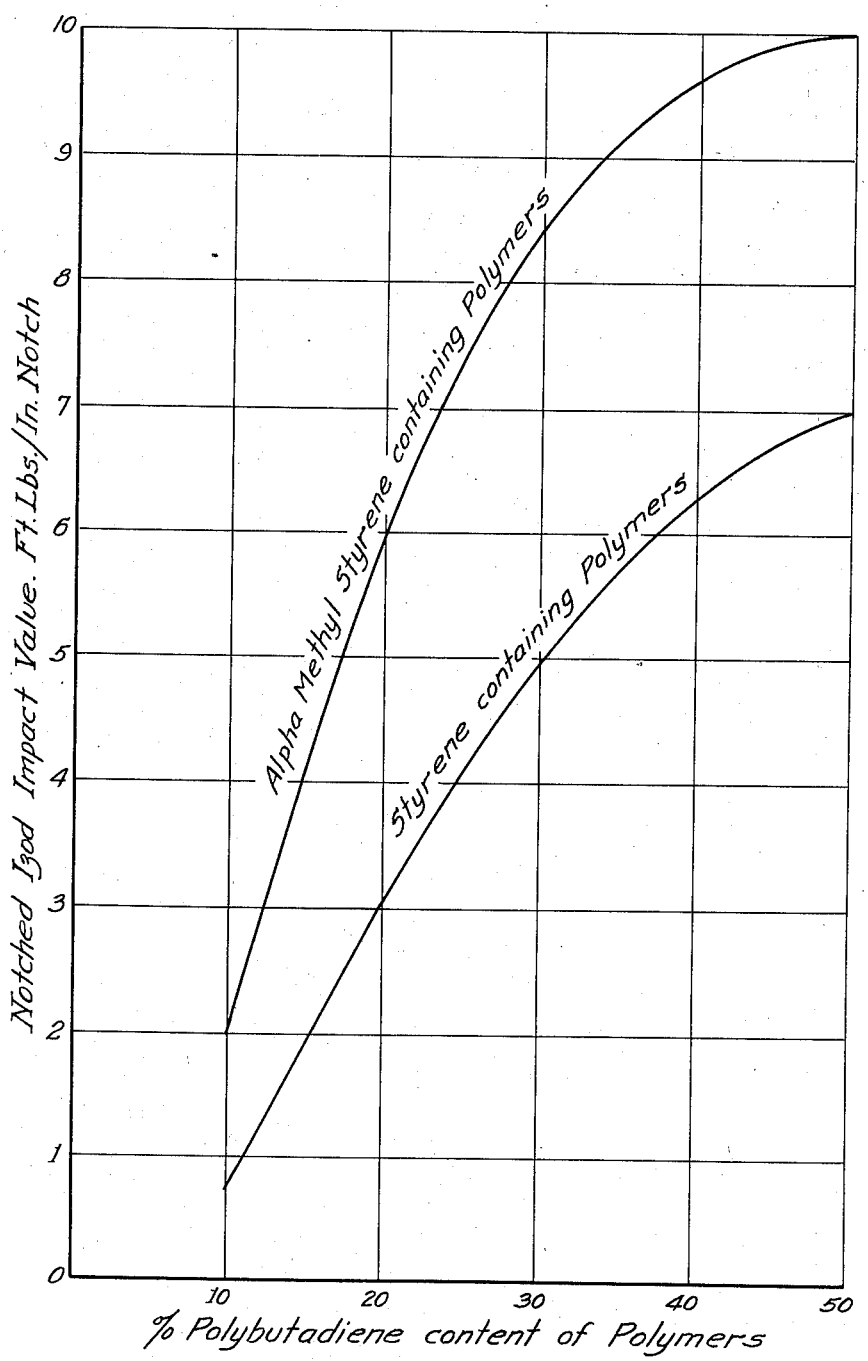

2,908,661

POLYMERIZATION OF ACRYLONITRILE-ALPHA METHYL STYRENE MIXTURES ONTO POLYBUTADIENE AND PRODUCTS PRODUCED THEREBY

William C. Calvert, Gary, Ind., assignor to Borg-Warner Corporation, Chicago, Ill., a corporation of Illinois Application January 11, 1957, Serial No. 633,750

5 Claims. (Cl. 260—45.5)

The present invention relates to graft copolymers of polybutadiene, alpha methyl styrene and acrylonitrile and the method for making the copolymers. As used in this specification, and as defined in the Report on Nomenclature of the International Union of Pure and Applied Chemistry, Journal of High Polymer Science, volume 8, page 260, the term "graft copolymer" designates a high polymer, the molecules of which consist of two or more polymer parts of different compositions, chemically united together. A graft copolymer may be produced, for example, by polymerization of a given kind of monomer with subsequent polymerization of another kind of monomer onto the product of the first polymerization.

My copending application, Serial Number 383,379, filed September 30, 1953, describes and claims the preparation of polymeric products by the interaction, under polymerizing conditions, of a conjugated diolefine polymer latex with a mixture of a vinyl aromatic and a vinyl cyanide. While the greater part of this copending application is devoted to descriptions of the preparation of polymeric products by the interaction, under polymerizing conditions, of a polybutadiene latex with a mixture of styrene and acrylonitrile, Example 4 thereof discloses the preparation of polymeric products by the interaction, under polymerizing conditions, of a polybutadiene latex with a mixture of alpha methyl styrene and acrylonitrile. It was therein stated that replacement of styrene by alpha methyl styrene resulted in the production of polymeric products having softening points considerably higher than those of polymeric products made using styrene.

Additional work with the polybutadiene latex: alpha methyl styrene:acrylonitrile system and more extensive testing of the polymeric products resulting from the interaction, under polymerizing conditions, of the components of this system, confirmed the higher softening points of the polymeric products formed and, in addition, demonstrated that these polymeric products were superior in many other respects to polymeric products formed by the interaction, under polymerizing conditions, of a polybutadiene latex with a mixture of styrene and acrylonitrile. Thus, polymeric products resulting from the interaction, under polymerizing conditions, of a polybutadiene latex with a mixture of alpha methyl styrene and acrylonitrile, in addition to exhibiting higher softening points than polymers in which styrene was employed in the manufacturing process in place of alpha methyl styrene, also exhibited higher impact values, far superior aging properties, and enormously enhanced resistance, when in stressed condition, to various chemical agents in comparison with the behavior of polymers produced by the interaction, under polymerizing conditions, of a polybutadiene latex with a mixture of styrene and acrylonitrile. The differences in physical and chemical properties between the two types of polymeric products are quite new and unexpected and many of these differences are very distinctly differences in kind rather than differences in degree. As will become apparent from the subsequent exposition, the polymeric products of this invention constitute distinctly new and novel compositions of matter.

One object of this invention is to provide a process for the preparation of new and improved solid polymeric products.

A further object of this invention is to provide a process for the preparation of solid polymeric products exhibiting a high impact value.

Yet another object of this invention is to provide a process for the preparation of solid polymeric products exhibiting a high heat distortion temperature.

An additional object of this invention is to provide a process for the preparation of solid polymeric products exhibiting a high resistance to aging.

A further object of this invention is to provide a process for the preparation of solid polymeric products exhibiting a high resistance, when exposed in stressed condition, to various chemical agents.

Also, it is an object of this invention to provide solid polymeric products exhibiting improved physical and chemical properties.

Another object of this invention is to provide solid polymeric products of high impact value.

An additional object of this invention is to provide solid polymeric products exhibiting a high heat distortion temperature.

A further object of this invention is to provide solid polymeric products exhibiting a high resistance to aging.

Yet another object of this invention is to provide solid polymeric products exhibiting a high resistance, when exposed in stressed condition, to various chemical agents.

Other objects of this invention will become apparent as the description thereof proceeds.

This invention will be fully understood from a consideration of the following complete descriptions of a number of specific embodiments thereof in connection with the accompanying single sheet of drawing forming a part of this specification, said single sheet of drawing being a graphical representation of the impact values of the polymeric products of this invention as a function of the polybutadiene content thereof, compared with similar data for polymeric products of the prior art in which styrene was employed in the manufacturing process in place of the alpha methyl styrene. It is to be understood that the specific embodiments presented below are illustrative only and the spirit and scope of the invention is not necessarily limited thereto.

EXAMPLE 1

The following polymerization mixtures were prepared, the figures in Table I being parts by weight.

*Table I*

| Formula | L | M | N | O |
|---|---|---|---|---|
| 55% Polybutadiene latex | 36.36 | 54.54 | 72.72 | 90.9 |
| Polybutadiene equivalent | 20 | 30 | 40 | 50 |
| Alpha methyl styrene | 51 | 45 | 38 | 32 |
| Acrylonitrile | 29 | 25 | 22 | 18 |
| Cumene hydroperoxide | 0.75 | 0.65 | 0.55 | 0.45 |
| Dresinate No. 731 | 3.2 | 2.8 | 2.4 | 2.0 |
| Sodium pyrophosphate | 0.5 | 0.5 | 0.5 | 0.5 |
| Sodium hydroxide | 0.146 | 0.146 | 0.146 | 0.146 |
| Darvan No. 1 | 0.125 | 0.125 | 0.125 | 0.125 |
| Dextrose | 1.0 | 1.0 | 1.0 | 1.0 |
| Ferrous sulfate | 0.05 | 0.05 | 0.05 | 0.05 |
| Water | 183.5 | 175.4 | 167.0 | 159.0 |

NOTE.—Dresinate No. 731 is the sodium salt of hydrogenated disproportionated rosin. Darvan No. 1 is the sodium salt of polymerized alkylaryl sulfonic acid.

Polymerization was effected in six hours at 50° C., using a rotating glass reactor. The latices produced were stabilized by the addition of 1.2% by weight, based on the solids content of the resulting latices, of di-t-butyl p-cresol and then coagulated in dilute sulfuric acid. The resulting solids were separated by filtration, washed, dried to constant weight, and finally milled and molded into sheets for testing. Translucency increased and surface hardness decreased with increasing polybutadiene content. Other physical properties were as follows (Table II):

Table II

| Formula | L | M | N | O |
|---|---|---|---|---|
| Tensile strength, lbs./sq. in. | 5,933 | 4,417 | 3,904 | 3,476 |
| Elongation, percent | 28 | 112 | 147 | 170 |
| Set, percent | 18 | 93 | 115 | 115 |
| Bursting strength | 465NB | 465NB | 375NB | 270NB |
| Softening point, °C | 112.5 | 110.5 | 106.0 | 99.5 |
| Brittle point, °C | −12.0 | −65.0 | −70.0 | −73.5 |
| Shore D hardness | 80 | 75 | 70 | 61 |
| Impact resistance | Excellent | Excellent | Excellent | Excellent |

Note.—Bursting strength determined on Mullen paper tester using sheets 0.040 inch thick. NB designates samples that did not rupture. Impact strength determined by sharply striking a sheet ⅛ inch thick against a corner of a stone slab.

EXAMPLE 2

The polymerization recipes of this example were the same as those of Example 1 with the very important exception that in the present example styrene was used in place of the alpha methyl styrene of Example 1. The polymerization procedure, method of product recovery, purification and processing were the same in both examples.

The following Table III shows the weight ratios polybutadiene:styrene:acrylonitrile employed in the various polymerization recipes of the present example together with test data on the polymeric products obtained.

Table III

| Formula | H | F | I | J |
|---|---|---|---|---|
| Polybutadiene, dry basis | 20 | 30 | 40 | 50 |
| Styrene | 51 | 45 | 38 | 32 |
| Acrylonitrile | 29 | 25 | 22 | 18 |
| Totals | 100 | 100 | 100 | 100 |
| Tensile strength, lbs./sq. in. | 5,982 | 4,938 | 3,892 | 3,585 |
| Elongation, percent | 22 | 120 | 135 | 173 |
| Set, percent | 17 | 93 | 105 | 118 |
| Bursting strength | 588 | 515NB | 370NB | 270NB |
| Softening point, °C | 94.5 | 97.5 | 90.0 | 86.0 |
| Brittle point, °C | 25.0 | −62.5 | −70.0 | −73.5 |
| Shore D hardness | 80 | 76.5 | 70 | 65 |
| Impact resistance | Good | Excellent | Excellent | Excellent |

A comparison of physical test data on the styrene containing polymers of this example with corresponding data on the alpha methyl styrene containing polymers of Example 1 will show that the only really significant difference between the two types of polymers resides in their softening points (heat distortion temperatures). The softening points of the alpha methyl styrene containing polymers of Example 1 are from 13° to 18° C. higher, averaging 15° C. higher, than the softening points of corresponding styrene containing polymers of the present example.

There is some indication that the impact resistance of certain alpha methyl styrene containing polymers may be higher than that of corresponding styrene containing polymers but the test method here employed to determine this property was so qualitative that the differences shown are hardly significant. With respect to the other physical properties determined, alpha methyl styrene containing polymers and corresponding styrene containing polymers appear to be identical.

EXAMPLE 3

In order to measure more accurately the differences in physical properties between alpha methyl styrene containing polymers and styrene containing polymers, a large number of polymer samples containing alpha methyl styrene were prepared and tested as set forth in this example.

Limiting consideration for the moment to the polybutadiene, alpha methyl styrene and acrylonitrile components of the polymerization recipes, three series of runs were made, the polybutadiene in the four individual runs of each series comprising 10%, 20%, 30% and 50% by weight of the three component mixture, the alpha methyl styrene plus acrylonitrile accordingly comprising 90%, 80%, 70%, and 50% by weight, respectively, of the three component mixture. In one series of runs the alpha methyl styrene/acrylonitrile weight ratio was held constant at 2.1, in a second series this ratio was 1.8 while in the final series this ratio was 1.5.

In addition to the three major components of the polymerization recipes considered in the previous paragraph, each polymerization recipe contained, per 100 parts by weight polybutadiene plus alpha methyl styrene plus acrylonitrile, the following additional materials in parts by weight:

| | |
|---|---|
| Cumene hydroperoxide | 0.73 |
| Desinate No. 731 | 1.96 |
| Sodium pyrophosphate, anhydrous | 0.5 |
| Sodium hydroxide | 0.15 |
| Daxad No. 11 | 0.13 |
| Cerelose | 1.0 |
| Ferrous sulfate, heptahydrate | 0.011 |
| Potassium oleate | 2.0 |
| Water | 184.5 |

Note.—Daxad No. 11. Polymerized sodium salts of alkyl naphthalene sulfonic acids. Cerelose is a commercial dextrose.

In all instances the recipes were polymerized under agitation in a glass flask at 60° C. and the polymer formed was recovered from the resulting reaction product, purified and then further processed as set forth in Example 1 hereof.

The following Table IV gives the parts by weight of polybutadiene, alpha methyl styrene and acrylonitrile used in each individual run. As mentioned previously, each individual polymerization recipe also contained the additional ingredients set forth in the listing immediately above. Table IV also presents physical test data on the individual polymers produced.

Table IV

| Formula | 1 | 2 | 3 | 4 | 5 | 6 | 7 | 8 | 9 | 10 | 11 | 12 |
|---|---|---|---|---|---|---|---|---|---|---|---|---|
| 55% Polybutadiene latex | 18.18 | 36.36 | 54.54 | 90.0 | 18.18 | 36.36 | 54.54 | 90.9 | 18.18 | 36.36 | 54.54 | 90.9 |
| Polybutadiene equivalent | 10 | 20 | 30 | 50 | 10 | 20 | 30 | 50 | 10 | 20 | 30 | 50 |
| Alpha methyl styrene | 61 | 54.2 | 47.4 | 33.85 | 57.8 | 51.45 | 45 | 32.15 | 54 | 48 | 42 | 30 |
| Acrylonitrile | 29 | 25.8 | 22.6 | 16.15 | 32.2 | 28.55 | 25 | 17.85 | 36 | 32 | 28 | 20 |
| Alpha methyl styrene/acrylonitrile weight ratio | 2.1 | 2.1 | 2.1 | 2.1 | 1.8 | 1.8 | 1.8 | 1.8 | 1.5 | 1.5 | 1.5 | 1.5 |
| Heat distortion temperature, °C. (ASTM D648–45T) | 98.0 | 105.0 | 102.0 | 102 | 101 | 100 | 103.5 | 97.5 | 99 | 98 | 99.5 | 93.5 |
| Rockwell hardness, R scale (ASTM D785–51) | 111 | 104 | 85 | 28 | 112 | 102 | 84 | | 113 | 101 | 84 | |
| Notched Izod impact strength at 22.8° C., foot pounds per inch of notch (ASTM D–758–48) | 1.6 | 6.4 | 8.6 | 10.5 | 1.8 | 3.7 | 9.3 | 10.3 | 2.6 | 5.4 | 7.6 | 9.3 |
| Fadeometer exposure in hours before sample fails in −20° F. falling ball test | 0 | 44 | 22 | OK after 371 | 0 | 22 | 88 | OK after 371 | 44 | 22 | 44 | 44 |

The physical properties of the polybutadiene-alpha methyl styrene-acrylonitrile polymers prepared as above described were compared with those of polybutadiene-styrene-acrylonitrile polymers. In all instances comparisons were made between polymers having the same polybutadiene content and the same vinyl aromatic/acrylonitrile weight ratio.

The data of Table IV show that at constant alpha methyl styrene/acrylonitrile ratios, the heat distortion temperature is not generally affected by the polybutadiene content of the polymer, especially at intermediate values of polybutadiene content. There is evidence however that at ratios of 1.8 and 1.5 the heat distortion temperature of polymers containing 50% polybutadiene is lower than that of polymers containing lesser amounts of polybutadiene. At the 2.1 ratio the opposite appears to be true, the heat distortion temperature of the polymer containing 10% polybutadiene being lower than that of polymers containing larger amounts of polybutadiene. There is no question that the alpha methyl styrene/acrylonitrile ratio has a slight but definite effect on heat distortion temperature, the heat distortion temperature as a rule decreasing slightly as this ratio decreases.

The heat distortion temperatures of polybutadiene-styrene-acrylonitrile polymers exhibit the same variations with changes in composition as do polybutadiene-alpha methyl styrene-acrylonitrile polymers but the heat distortion temperatures of polybutadiene-styrene-acrylonitrile polymers are always very appreciably lower than those of polybutadiene-alpha methyl styrene-acrylonitrile polymers of corresponding composition. Thus a typical 30:45:25 polybutadiene-styrene-acrylonitrile polymer (compare Formula 7, Table IV) has a heat distortion temperature of only 84° C.

Table IV demonstrates that the alpha methyl styrene/acrylonitrile ratio has no measurable effect on the Rockwell hardness (R scale) of the polymers but that polybutadiene content has a marked influence on hardness. As the polybutadiene content is increased from 10% to 50%, the hardness falls from about 112 to a value below 30. Polybutadiene-styrene-acrylonitrile polymers exhibit a similar trend. Polybutadiene-alpha methyl styrene-acrylonitrile polymers generally have a very slightly lower Rockwell hardness (R scale) than polybutadiene-styrene-acrylonitrile polymers of corresponding composition. At a vinyl aromatic/acrylonitrile ratio of 2.1, polybutadiene-styrene-acrylonitrile polymers have a hardness 0 to 2 units higher than that of polybutadiene-alpha methyl styrene-acrylonitrile polymers of corresponding composition; when this ratio is 1.8 the hardness difference is from 0 to 4 units and at a ratio of 1.5 the hardness difference is from 2 to 7 units. In general, the difference in hardness between the two types of polymers is least when polybutadiene content is low, the difference increasing with increasing polybutadiene content.

The notched Izod impact strength of polybutadiene-alpha methyl styrene-acrylonitrile polymers is not influenced in any regular fashion by the alpha methyl styrene/acrylonitrile ratio used in preparing the polymers but the polybutadiene content of the polymer has a very marked effect on the impact strength exhibited. As the polybutadiene content of these polymers increases from 10% to 50%, the notched Izod impact strength in foot pounds per inch of notch increases from about 2 to about 10.

The notched Izod impact strengths of polybutadiene-styrene-acrylonitrile polymers is always appreciably lower than those of polybutadiene-alpha methyl styrene-acrylonitrile polymers of corresponding composition. The following Table V shows the average impact strengths (taken from Table IV) of polybutadiene-alpha methyl styrene-acrylonitrile polymers of the designated constant polybutadiene content together with corresponding data on polybutadiene-styrene-acrylonitrile polymers of the same polybutadiene content. Since, as mentioned previously, vinyl aromatic/acrylonitrile ratio has no observable effect on impact strength, the averages include polymers in which this ratio ranges from 2.1–1.5 to 1.

*Table V*

| Polybutadiene Content, Percent | Notched Izod Impact Strength, Foot Pounds | |
| --- | --- | --- |
|  | Polybutadiene-Alpha Methyl Styrene-Acrylonitrile Polymers | Polybutadiene-Styrene-Acrylonitrile Polymers |
| 10 | 2.0 | 0.7 |
| 20 | 5.2 | 3.0 |
| 30 | 8.5 | 5.0 |
| 50 | 10.0 | 7.0 |

The single sheet of drawing that accompanies this specification and is a part thereof is a graphical representation of the data presented in Table V wherein smooth curves are drawn through the two sets of average experimental datum points presented in this table. At a low polybutadiene content (10%) the impact values of the two types of polymer are both low but the impact value of the polybutadiene-alpha methyl styrene-acrylonitrile polymer is almost three times as great as the impact value of the polybutadiene-styrene-acrylonitrile polymer. As polybutadiene content increases, the impact values of the resulting polymeric products increase also but the impact value of a polybutadiene-alpha methyl styrene-acrylonitrile polymer is invariably appreciably greater than that of a polybutadiene-styrene-acrylonitrile polymer of corresponding composition but the percentage difference between the two impact values becomes less as the polybutadiene content increases. Thus, at 50% polybutadiene content, the impact value of the polybutadiene-alpha methyl styrene-acrylonitrile polymer is 43% greater than that of the polybutadiene-styrene-acrylonitrile polymer.

An accelerated test was developed to evaluate the resistance to aging of the polymeric products of this invention. Experiments demonstrated that the results of this accelerated test correlated very well with the results obtained in actual out-of-doors exposures which, of course, usually had to be continued for inordinately long periods of time to result in failure.

In this accelerated test, the polymeric product was sheeted to a thickness of 0.080 inch and the resulting sheet was cut into a six by six inch test panel. The test panel was exposed for a predetermined period of time to radiation in a Fadeometer. After exposure, the test panel was held at −20° F. for four hours in a cold box. At the end of this period, the panel was rapidly centered in a horizontal position on a steel supporting ring having a central hole 3⅝ inches in diameter, the panel being held in firm contact with the steel supporting ring by a clamping device. This panel mounting device was also held in the cold box and was centered below an opening (which was usually closed with a plug) in the lid of the cold box. After mounting the panel, the resulting assembly was allowed to rest undisturbed in the cold box for an appreciable time—at least five minutes—immediately following which the plug was removed from the opening in the lid of the cold box and a 535 g. steel ball (approximately 19 ounces) was dropped from a height of 4.5 feet through the opening in the lid of the cold box onto the center of the area of the horizontally mounted test panel that was supported by the steel ring. Following this drop test the panel was examined for evidence of cracking which was considered to represent failure due to aging.

Of course, in determining the resistance to aging of an individual polymeric product, a number of test panels prepared from the polymer were exposed to radiation in the Fadeometer, each test panel being exposed for an individually predetermined period of time. Then the exposed panels were separately subjected to the previously described −20° F. falling ball test to determine the number of hours Fadeometer exposure required before failure occurred in the −20° F. falling ball test.

Table IV shows that at alpha methyl styrene/acrylonitrile weight ratios of 2.1 and 1.8, the aging resistance of the polymers generally increases with increasing polybutadiene content. At these ratios and at 10% polybutadiene content, the polymers fail in the −20° F. falling ball test even if not exposed in the Fadeometer but at 50% polybutadiene content the polymeric products withstand the −20° F. falling ball test even after 371 hours exposure in the Fadeometer. At an alpha methyl styrene/acrylonitrile ratio of 1.5, polybutadiene content has no such effect on aging resistance. At this low ratio, the 10% polybutadiene content polymer shows a high resistance to aging (in contrast to failure without exposure of 10% polybutadiene polymers at the higher ratios). At the 1.5 ratio, the 50% polybutadiene content polymer shows a high resistance to aging but not the interminably long resistance to aging exhibited by the 50% polybutadiene content polymers of 1.8 and 2.1 ratios.

The aging resistance of polybutadiene-alpha methyl styrene-acrylonitrile polymers is very much higher than that of polybutadiene-styrene-acrylonitrile polymers of corresponding composition. Thus, polybutadiene-styrene-acrylonitrile polymers corresponding to Formulas 6, 7 and 8 of Table IV (with, of course, styrene used in place of alpha methyl styrene) required Fadeometer exposures of, respectively, 0, 22, and 22 hours before failing in the −20° F. falling ball tests. Corresponding exposure times of polybutadiene-alpha methyl styrene-acrylonitrile polymers, taken from Table IV, are, respectively, 22, 88 and (no failure after) 371 hours.

The polybutadiene-styrene-acrylonitrile polymers described briefly herein and in more detail in my aforementioned copending application are useful in the fabrication of plastic pipe. However, it has been found that such polymers, when under stress, are not resistant to a number of chemical agents and this fact seriously limits the range of applicability of pipe made from such polymers and also limits the use of the material as a chemically resistant liner for drums, vessels and the like. However, it has been found that polybutadiene-alpha methyl styrene-acrylonitrile polymers, even when under stress, resist the action of chemical agents that will destroy stressed polybutadiene-styrene-acrylonitrile polymers in from less than a minute to a few hours.

In testing the chemical resistance of polymers when under stress, a strip was cut from a standard ASTM slab of the polymer and was bent and inserted into a spring clamp, the spring clamp holding the test strip in a bent, stressed position. The resulting assembly was then immersed in the selected chemical, denatured alcohol and a 10% aqueous solution of potassium permanganate being here employed, these two materials having been found to be among the most active chemicals in causing failure of stressed polymers.

A stressed test strip of a polybutadiene-alpha methyl styrene-acrylonitrile polymer did not develop any cracks when immersed in denatured alcohol for one week. A similarly stressed polybutadiene-styrene-acrylonitrile test strip failed in denatured alcohol in less than one minute.

A stressed test strip of a polybutadiene-alpha methyl styrene-acrylonitrile polymer did not develop any cracks when immersed in 10% aqueous potassium permanganate solution for one week. A similarly stressed polybutadiene-styrene-acrylonitrile test strip failed in 10% aqueous potassium permanganate solution in less than 12 hours.

These stressed chemical resistance tests described in the previous paragraphs embraced a sufficient number of controls and replicates to assure that the results were not due to non-uniformity in either test strips or spring clamp tensions.

EXAMPLE 4

Somewhat modified polymerization recipes and polymerization procedures were employed in the runs of this example. Confining attention for the moment to polybutadiene, alpha methyl styrene and acrylonitrile, in all instances the polybutadiene comprised 30% by weight of the three component mixture, alpha methyl styrene 45% by weight and acrylonitrile 25% by weight thereof. (Alpha methyl styrene/acrylonitrile weight ratio, 1.8.)

In addition to the three major components of the polymerization recipes mentioned above, with one exception to be specifically mentioned subsequently, each polymerization recipe contained, per 100 parts by weight of the polybutadiene-alpha methyl styrene-acrylonitrile mixture, the following materials in parts by weight:

| | |
|---|---|
| Para menthane hydroperoxide | 0.73 |
| Dresinate No. 731 | 1.96 |
| Sodium pyrophosphate decahydrate | 1.5 |
| Sodium hydroxide | 0.15 |
| Daxad No. 11 | 0.13 |
| Fructose | 0.5 |
| Ferrous sulfate heptahydrate | 0.034 |
| Mixed tertiary mercaptans | 0.5 |
| Water | 182.7 |

NOTE.—Mixed tertiary mercaptans designate a mixture of $C_{12}$, $C_{14}$ and $C_{16}$ tertiary alkyl mercaptans in approximately 60:20:20 weight ratio. Mixed tertiary mercaptans were employed in Formulas 13, 14 and 15 of Table VI to follow but mixed tertiary mercaptans were not present in Formula 16 of said table.

In all instances the recipes were polymerized at 65° C. in a glass flask under agitation and the polymers formed were recovered from the resulting reaction products, purified and further processed as set forth in Example 1. Even after milling, the polymers of this example retained a strong odor of para menthane hydroperoxide. The polymerization time of the recipes of this example was much shorter than that required when polymerizing the recipes of Example 3, for example.

Table VI presents physical test data on the polymeric products produced by polymerizing the recipes of this example.

*Table VI*

| Formula | 13 | 14 | 15 | 16[1] |
|---|---|---|---|---|
| Heat distortion temperature, ° C. (ASTM D648-45T) | 100 | 103 | 104 | 107.5 |
| Rockwell Hardness, R Scale (ASTM D785-51) | 82 | 86 | 87 | 74 |
| Notched Izod impact strength at 22.8° C., foot pounds/inch of notch (ASTM D758-48) | 6.7 | 8.1 | 7.3 | 7.3 |

[1] No mixed tertiary mercaptans used in the recipe.

The first three runs of Table VI are duplicate experiments. Comparing the physical properties of the polymeric products produced in these three runs with those of corresponding polymers shown in Table IV (Formulas 3, 7 and 11) it is seen that the heat distortion temperature and Rockwell hardness (R scale) of the two groups of polymers are essentially identical. The impact strength of Formulas 13, 14 and 15 polymers is a little lower (averaging about one foot pound lower) than corresponding polymers of Table IV.

The resistance to chemical agents when under stress was determined using the polymeric product resulting from the polymerization of Formula 13. These tests were run as described in Example 3. The Formula 13 polymer, stressed as previously described, was not affected when immersed for four days in denatured alcohol or in 10% aqueous potassium permanganate solution. A polybutadiene-styrene-acrylonitrile polymer of corresponding composition when tested similarly failed in less than one minute in denatured alcohol and failed after seven hours immersion in 10% aqueous potassium permanganate solution.

EXAMPLE 5

Table VII presents information on a number of polymerization recipes (in parts by weight) and certain physical properties of the polymeric products obtained by the polymerization of these recipes. The polymerization recipes are rather similar to that of Formula 7 of Table IV (data on this formula being repeated in Table VII to facilitate comparisons) although the individual polymerization recipes differed from that of Formula 7 in at least one significant respect as specifically set forth below.

In all formulations, polybutadiene comprised 30% by weight of the polybutadiene-alpha methyl styrene-acrylonitrile mixture. Alpha methyl styrene and acrylonitrile comprised, respectively, 45% by weight and 25% by weight of this three component mixture, the alpha methyl styrene/acrylonitrile weight ratio being 1.8. Individual fixed quantities of cumene hydroperoxide, sodium pyrophosphate, ferrous sulfate, Daxad No. 11 and Cerelose were used in all recipes.

Formula 17 is similar to Formula 7 except that Formula 17 contains no potassium oleate and a polymerization temperature of 65° C. (instead of 60° C.) was employed. Formula 18 differs from Formula 17 in that Dresinate No. 731 was increased from 1.96 to 5.0 parts by weight.

Formula 7 has previously been discussed. Formulas 19, 20 and 21 are duplicate runs and are similar in all respects to Formula 7. However, in Formulas 19, 20 and 21 the polymerization temperature was 65° C. instead of the 60° C. employed in the polymerization of Formula 7.

In Formulas 22, 23 and 24, the potassium oleate used in Formulas 19–21 was replaced by increasing amounts of Rubber Reserve flakes (soap).

Formula 25 is similar to Formula 18 with the exception that Formula 25 contains 0.5 part by weight mixed tertiary mercaptans.

Formulas 26 and 27 are similar to Formulas 19–21 with the exception that the recipe of Formula 26 contains 0.5 part by weight tertiary octyl mercaptan while that of Formula 27 contains 0.5 part by weight diisopropyl dixanthogen.

sary to perform a series of replicate "standard" experiments and treat the data obtained by statistical methods and then determine if data obtained in another series of replicated experiments, run under conditions other than those selected as "standard," differ by a statistically significant amount from the results of the "standard" experiments. The data of Table VII, considered in conjunction with the data obtained in a number of additional replicate experiments, show that the variations in polymerization recipes and polymerization conditions set forth in Table VII and outlined in the previous discussion have no significant effect on the physical properties set forth in Table VII of the polymers produced.

Since any variations in the physical properties listed in Table VII are not statistically significant, it is proper to average the individual values of each property listed. On this basis, the average heat distortion temperature of these polymers is 101° C., the average Rockwell hardness (R scale) is 85 and the average notched Izod impact strength is 7.9 foot pounds per inch of notch.

These average values differ in a statistically significant manner from the average value of the same physical properties of polybutadiene-styrene-acrylonitrile polymers of corresponding composition. Thus, the heat distortion temperature of polybutadiene-alpha methyl styrene-acrylonitrile polymers is very much higher (10° C., or more, higher), the impact strength is appreciably higher (about 3.0 foot pounds per inch of notch higher), while the Rockwell hardness (R scale) is very slightly but significantly lower (about 3 units lower) than corresponding values exhibited by polybutadiene-styrene-acrylonitrile polymers of corresponding composition.

As used herein, the terms (a) "polybutadiene-alpha methyl styrene-acrylonitrile polymers" and (b) "polybutadiene-styrene-acrylonitrile polymers" designate the polymeric products formed by the interaction, under polymerizing conditions, of (a) a polybutadiene latex, alpha methyl styrene and acrylonitrile and (b) a polybutadiene latex, styrene and acrylonitrile.

As used herein, the term "corresponding composition" as applied to a plurality of polymers designates polymers resulting from the interaction, under polymerizing conditions, of mixtures containing identical weight per-

*Table VII*

| Formula | 17 | 18 | 7 | 19 | 20 | 21 | 22 | 23 | 24 | 25 | 26 | 27 |
|---|---|---|---|---|---|---|---|---|---|---|---|---|
| 55% Polybutadiene latex | 54.54 | 54.54 | 54.54 | 54.54 | 54.54 | 54.54 | 54.54 | 54.54 | 54.54 | 54.54 | 54.54 | 54.54 |
| Polybutadiene equivalent | 30 | 30 | 30 | 30 | 30 | 30 | 30 | 30 | 30 | 30 | 30 | 30 |
| Alpha methyl styrene | 45 | 45 | 45 | 45 | 45 | 45 | 45 | 45 | 45 | 45 | 45 | 45 |
| Acrylonitrile | 25 | 25 | 25 | 25 | 25 | 25 | 25 | 25 | 25 | 25 | 25 | 25 |
| Cumene hydroperoxide | 0.73 | 0.73 | 0.73 | 0.73 | 0.73 | 0.73 | 0.73 | 0.73 | 0.73 | 0.73 | 0.73 | 0.73 |
| Dresinate No. 731 | 1.96 | 5.0 | 1.96 | 1.96 | 1.96 | 1.96 | 1.96 | 1.96 | 1.96 | 5.0 | 1.96 | 1.96 |
| Sodium pyrophosphate, anhydrous | 0.5 | 0.5 | 0.5 | 0.5 | 0.5 | 0.5 | 00.5 | 0.5 | 0.5 | 0.5 | 0.5 | 0.5 |
| Sodium hydroxide | 0.15 | 0.15 | 0.15 | 0.15 | 0.15 | 0.15 | 0.15 | 0.15 | 0.15 | 0.15 | 0.15 | 0.15 |
| Daxad No. 11 | 0.13 | 0.13 | 0.13 | 0.13 | 0.13 | 0.13 | .13 | 0.13 | 0.13 | 0.13 | 0.13 | 0.13 |
| Cerelose | 1.0 | 1.0 | 1.0 | 1.0 | 1.0 | 1.0 | 1.0 | 1.0 | 1.0 | 1.0 | 1.0 | 1.0 |
| Ferrous sulfate heptahydrate | 0.011 | 0.011 | 0.011 | 0.011 | 0.011 | 0.011 | 0.011 | 0.011 | 0.011 | 0.011 | 0.011 | 0.011 |
| Water | 181.5 | 187.0 | 184.5 | 184.5 | 184.5 | 182.0 | 182.0 | 183.2 | 184.5 | 187.0 | 182.0 | 182.0 |
| Potassium oleate | | | 2.0 | 2.0 | 2.0 | 2.0 | | | | | | |
| Rubber Reserve flakes | | | | | | | 0.5 | 1.5 | 2.0 | | 2.0 | 2.0 |
| Mixed tertiary alkyl mercaptans | | | | | | | | | | 0.5 | | |
| Tertiary octyl mercaptan | | | | | | | | | | | 0.5 | |
| Diisopropyl dixanthogen | | | | | | | | | | | | 0.5 |
| Polymerization temperature, °C | 65 | 65 | 60 | 65 | 65 | 65 | 65 | 65 | 65 | 65 | 65 | 65 |
| Heat distortion temperature, °C (ASTM D648–45T) | 100.0 | 103.0 | 103.5 | 100.0 | 101.0 | 103.5 | 102.5 | 98.5 | 99.0 | 100.5 | 102.5 | 100.0 |
| Rockwell hardness, R scale (ASTM D785–51) | 87 | 92 | 84 | 86 | 80 | 84 | 85 | 85 | 87 | 89 | 88 | 82 |
| Notched Izod impact strength at 22.8° C. Ft. lbs./inch notch (ASTM D758–48) | 7.7 | 8.5 | 9.3 | 8.1 | 6.7 | 9.7 | 8.3 | 7.2 | 6.5 | 8.2 | 8.1 | 6.9 |

As will be obvious to those skilled in the art, in work of the type herein described, involving a complicated group of polymerization reactions occurring in a very complex reaction mixture, absolute correspondence between the results of duplicate experiments is not to be expected. Not only are the polymerization reactions involved very complex but, in addition, some components of the reaction mixture are used in very minute amounts and these minor components have an extremely pronounced effect on the speed and the course of the polymerization reactions. In such circumstances it is neces- centages of a polybutadiene latex, a vinyl aromatic and acrylonitrile.

This application is in part a continuation of my co-pending application, Serial Number 383,379, filed September 30, 1953.

Be it remembered, that while this invention has been described in connection with specific details and specific embodiments thereof, these details and embodiments are illustrative only and are not to be considered limitations on the spirit or scope of said invention except in so far as they may be incorporated in the appended claims.

I claim:
1. A process for the production of synthetic resins comprising polymerizing, at a temperature in the approximate range 50° C. to 80° C., a mixture of acrylonitrile and alpha methyl styrene in the presence of polybutadiene present in the form of an aqueous polybutadiene latex.

2. A process for the production of synthetic resins comprising polymerizing, at a temperature in the approximate range 50° C. to 80° C., from about 40 to about 90 parts by weight of a mixture of alpha methyl styrene and acrylonitrile in a weight ratio within the approximate range 1.5–2.1 to 1.0 in the presence of from about 60 to about 10 parts by weight polybutadiene present in the form of an aqueous polybutadiene latex.

3. A process for the production of synthetic resins comprising polymerizing, at a temperature in the approximate range 50° C. to 80° C., from about 60 to about 80 parts by weight of a mixture of alpha methyl styrene and acrylonitrile in a weight ratio within the approximate range 1.5–2.1 to 1, in the presence of about 40 to about 20 parts by weight polybutadiene present in the form of an aqueous polybutadiene latex.

4. A process for the production of synthetic resins comprising polymerizing, at a temperature in the approximate range 60° C. to 70° C., a mixture of approximately 45 parts by weight alpha methyl styrene and approximately 25 parts by weight acrylonitrile, in the presence of approximately 30 parts by weight polybutadiene present in the form of an aqueous polybutadiene latex.

5. Hard, high impact strength, polybutadiene-alpha methyl styrene-acrylonitrile graft copolymers exhibiting heat distortion temperatures of at least 100° C. and characterized by a high resistance, when in stressed condition, to the action of chemical agents.

References Cited in the file of this patent

UNITED STATES PATENTS

| | | |
|---|---|---|
| 2,356,091 | Roedel | Aug. 15, 1944 |
| 2,688,009 | Crouch | Aug. 31, 1954 |
| 2,755,270 | Hayes | July 17, 1956 |
| 2,802,808 | Hayes | Aug. 13, 1957 |

FOREIGN PATENTS

| | | |
|---|---|---|
| 679,562 | Great Britain | Sept. 17, 1952 |

UNITED STATES PATENT OFFICE

CERTIFICATE OF CORRECTION

Patent No. 2,908,661 October 13, 1959

William C. Calvert

It is hereby certified that error appears in the printed specification of the above numbered patent requiring correction and that the said Letters Patent should read as corrected below.

Column 3, Table II, second column thereof, under the heading "L", first line, for "5,933" read -- 5,993 --; columns 9 and 10, Table VII, eighth column thereof, under the heading "22", ninth line, for ".13" read -- 0.13 --.

Signed and sealed this 12th day of April 1960.

(SEAL)
Attest:

KARL H. AXLINE
Attesting Officer

ROBERT C. WATSON
Commissioner of Patents